United States Patent [19]

Tsuchihashi et al.

[11] Patent Number: 5,649,455

[45] Date of Patent: Jul. 22, 1997

[54] VEHICLE STEERING WHEEL

[75] Inventors: Toshifumi Tsuchihashi, Hiratsuka; Kunio Ohya, Wako; Satoshi Hamada, Mitaka, all of Japan

[73] Assignees: The Yokohama Rubber Co., Ltd.; Honda Giken Kogyo Kabushiki Kaisha; Kikuchi Metal Stamping Co., Ltd., all of Tokyo, Japan

[21] Appl. No.: 412,117

[22] Filed: Mar. 28, 1995

[30] Foreign Application Priority Data

Mar. 30, 1994 [JP] Japan .................. 6-061039

[51] Int. Cl.$^6$ .................................................. B62D 1/11
[52] U.S. Cl. .................................................. 74/552; 280/750
[58] Field of Search .................... 74/552; 248/575, 248/622; 280/750, 751

[56] References Cited

U.S. PATENT DOCUMENTS

| | | | |
|---|---|---|---|
| 3,224,924 | 12/1965 | Von Ardenne et al. | 280/751 X |
| 3,685,369 | 8/1972 | Adams, III | 74/552 X |
| 4,657,121 | 4/1987 | Uchida et al. | 74/552 X |
| 4,939,951 | 7/1990 | Kaneko | 74/552 |
| 5,306,066 | 4/1994 | Saathoff | 280/751 X |

*Primary Examiner*—Rodney H. Bonck
*Assistant Examiner*—Mary Ann Battista
*Attorney, Agent, or Firm*—Finnegan, Henderson, Farabow, Garrett & Dunner

[57] ABSTRACT

A vehicle steering wheel is provided with a shock-absorbing device collapsibly mounted in the center pad for absorbing shock energy generated upon a vehicle collision. The shock absorbing device comprises a honeycomb core structure preferably of steel or aluminum which has its core walls disposed in a direction in which shock energy is exerted. The honeycomb core structure has a cell size, a core wall thickness and a core height all selected to demonstrate a maximum shock-absorbing performance.

6 Claims, 6 Drawing Sheets

1

VEHICLE STEERING WHEEL

BACKGROUND OF THE INVENTION

1. Field of the Invention

This invention relates generally to steering wheels for automotive vehicles and particularly to such a steering wheel which is provided with shock-absorbing means.

2. Description of Related Art

Various safety devices have been proposed for protecting a vehicle driver against the influence of a shock generated as in a vehicle collision accident. A typical example of such a device is an air bag housed in the steering wheel pad. This shock-absorbing device however has a drawback in that it is very costly and requires a relatively large space for installation. With a view to coping with the problems, it has been proposed in lieu of air bags to use shock-absorbing means comprised of a urethane resin or a steel skeleton material.

However, it has been ascertained as depicted in FIG. 11 of the accompanying drawings that although the urethane shock-absorbing material receives a relatively low initial load immediately upon a vehicle collision, it is susceptible to an increase in the buckling load with an increase in the stroke of an ensuing crush of the material, departing away from the desired shock-absorption characteristics where the buckling load should be held as much constant as possible.

With the steel skeleton material, this exhibits a sharp rise in the initial load immediately upon collision and then temporarily sustains a relatively low buckling load profile commensurate with an increase in the crush stroke but the buckling load soon resumes a sharp upward curve as illustrated in FIG. 12.

Thus, neither of the above two alternatives has proven to be successful in shock-energy absorbing performance called for in the event of a car accident such as a head-on crush. A further disadvantage is that a collapsible device formed from either of the above resinous and steel materials requires increased thickness in a direction along which its crash stroke extends, contributing to a large dimension of the steering wheel pad.

SUMMARY OF THE INVENTION

Accordingly, the present invention seeks to provide an improved shock-absorbing vehicle steering wheel which is capable of absorbing a collision energy at a maximum rate of efficiency and reliability with acceleration of shock stress upon, inter alia a vehicle operator held to an absolute minimum.

The invention further seeks to provide an improved shock-absorbing steering wheel which incorporates a shock-absorbing collapsible means having a reduced material thickness in and along the direction of its crush stroke compared to conventional counterparts, thus contributing to the availability of a space-saving or compact steering wheel center pad.

The invention also seeks to provide an improved shock-absorbing steering wheel which is relatively simple in construction and less costly.

According to the invention, there is provided a vehicle steering wheel incorporating a shock-absorbing means, the shock-absorbing means comprising a honeycomb core structure formed from a multiplicity of interconnected cells defined by core walls which are disposed to extend in and along a direction in which a shock energy is applied.

The above and other advantages and features will appear apparent to one skilled in the art from the following detailed description taken in conjunction with the accompanying drawings.

DETAILED DESCRIPTION OF THE INVENTION

Figure 1:
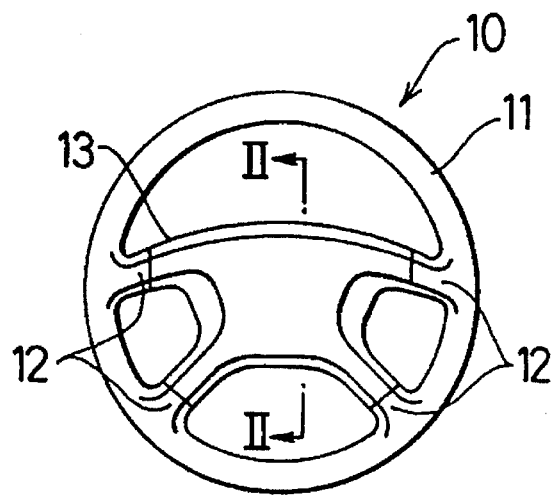
FIG. 1 is a front plan view of a shock absorbing steering wheel embodying the invention.

Referring now to the drawings and FIG. 1 in particular, there is shown a shock-absorbing vehicle steering wheel 10 according to the invention which comprises an annular steering portion or handle 11, spokes 12 radially extending therefrom and a cap-shaped center portion or pad 13 in which is housed a shock-absorbing means of the invention later described.

Figure 2:
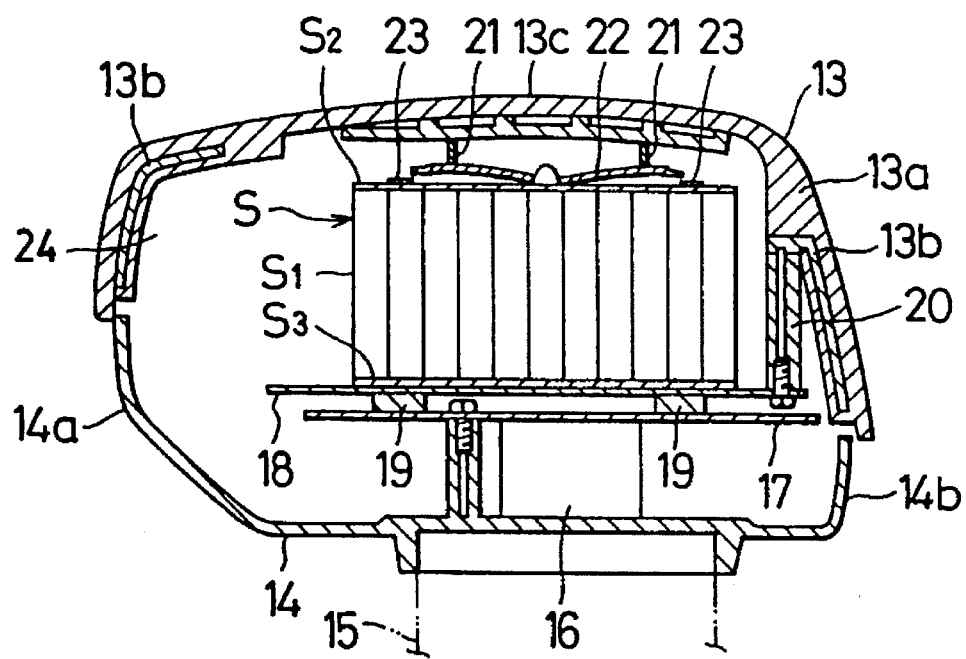
FIG. 2 is a cross-sectional view taken on the line II—II of FIG. 1.

As better shown in FIG. 2, a frame member 14 secured to a steering shaft 15 is provided at opposite ends with upwardly extending portions 14a and 14b. A support stud 16 is disposed axially centrally of the steering shaft 15 and connected between the frame member 14 and an intermediate plate member 17. Interposed between the plate member 17 and a mounting plate member 18 are a pair of spaced resilient or cushioning members 19. The mounting plate member 18 has one end thereof secured to a lug 20 extending downwardly peripherally from the center pad 13. The plate member 18 is adapted to support thereon a shock-absorbing means S (S') provided in accordance with the invention.

The center pad 13 defines therein a cavity or chamber 24 for accommodating the shock-absorbing means S, and includes a relatively thick peripheral wall 13a having embedded therein a reinforcing core 13b and a relatively thin center wall member 13c free of reinforcing core 13b. The center wall 13c is adapted to be depressed to energize a horn circuit (not shown) in a manner well known in the art.

Extending downwardly inwardly from the region of the center wall 13c of the pad 13 are a pair of projecting lugs 21 which are connected to a movable connecting strip 22 centrally supported on the upper portion of the shock-absorbing means S and having opposite ends releasably engageable with contact strips 23 for the horn circuit.

Figure 3A:
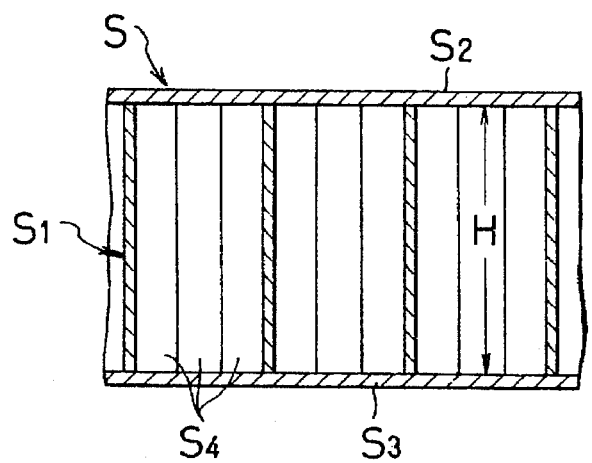
FIG. 3a and 3b are longitudinal and transverse cross-sectional views on enlarged scale of a portion of a shock-absorbing means used in the invention.
Figure 3B:
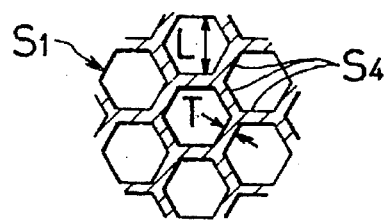
Figure 4:
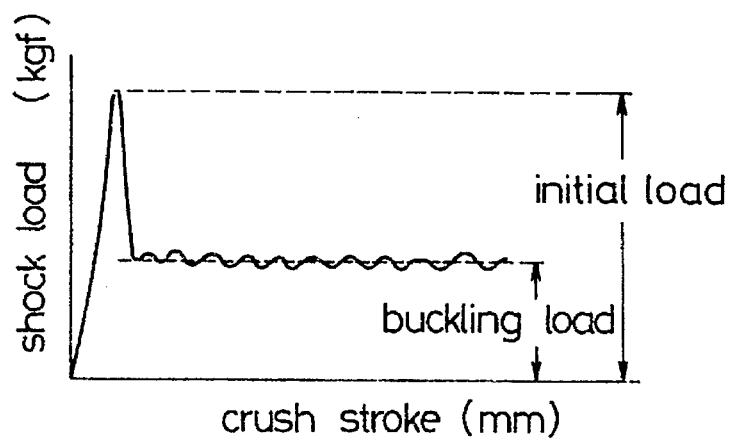
FIG. 4 is a graphical display representing a shock-absorbing performance characteristics of the inventive shock-absorbing means in which a shock load is plotted against a crush stroke.
Figure 5:
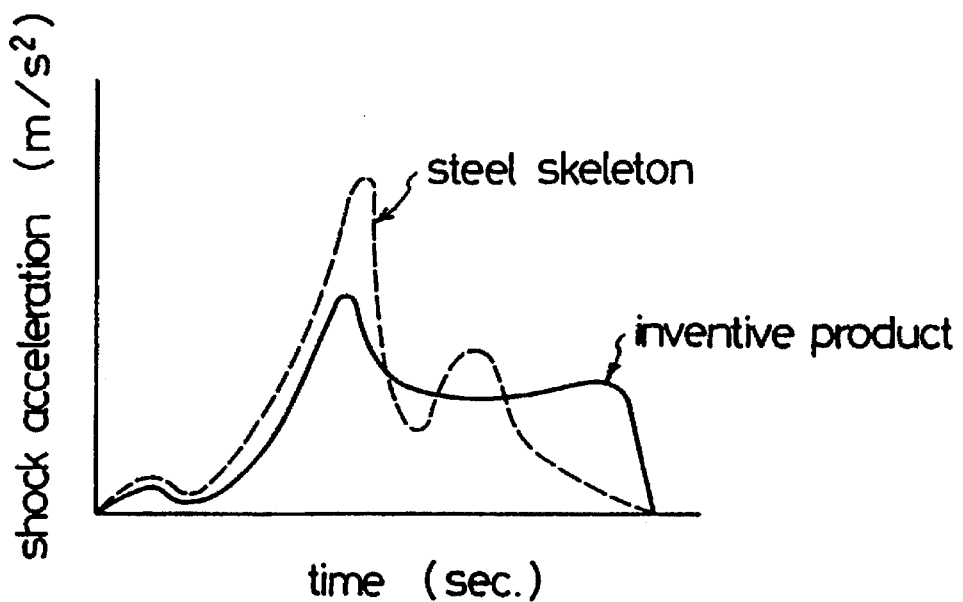
FIG. 5 is a graph illustrating a shock acceleration speed of the inventive shock-absorbing means as plotted against time.

The shock-absorbing means S according to the invention comprises a honeycomb core structure formed from a metallic material such as steel and aluminum, a paper such as K-liner and Kraft paper, and a resinous material such as polypropylene. As illustrated in FIGS. 3a and 3b, the honeycomb core structure has a multiplicity of interconnected cells S1 defined by core walls S4 which are shown for purposes of illustration to be cross-sectionally hexagonal in shape but may be of other suitable configuration. To consolidate the cells S1, opposite open ends thereof are, though not always necessary, covered with an upper surfacing plate member S2 and a lower surfacing plate member S3, respectively. The overall dimensions of the honeycomb core structure may vary with a particular steering wheel to which it is applied.

It has now been found that the shock-absorbing means S when made of steel exhibits satisfactory performance with a honeycomb cell size L or a distance between confronting core walls S4 selected in the range of 7.0–25.0 mm, a core wall thickness T in the range of 70–150 μm and a core height H (as measured between opposite open ends of the cells) in the range of 15–100 mm.

In the case of an aluminum honeycomb structure, the cell size L is preferably in the range of 6.0–25.0 mm; the core wall thickness T is preferably in the range of 25–75 μm; and the core height H is preferably in the range of 15–100 mm.

Figure 6:
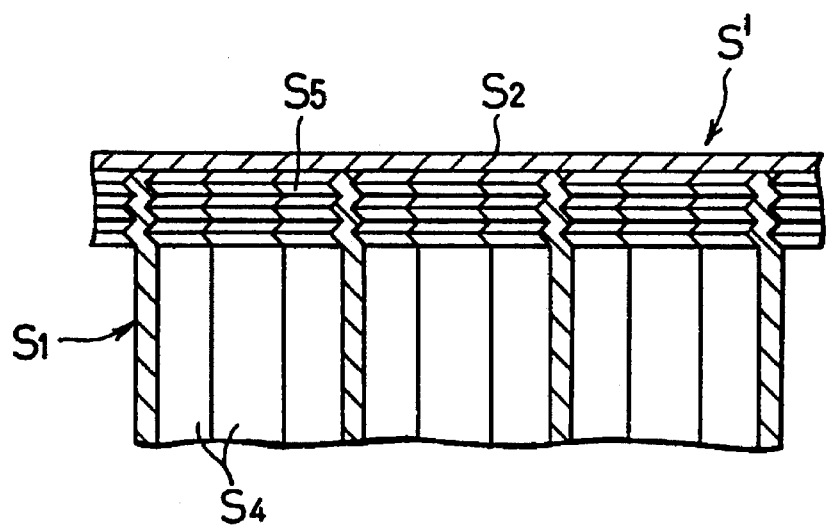
FIG. 6 is a longitudinal cross-sectional view on enlarged scale of a modified form of shock-absorbing means embodying the invention.
Figure 7:
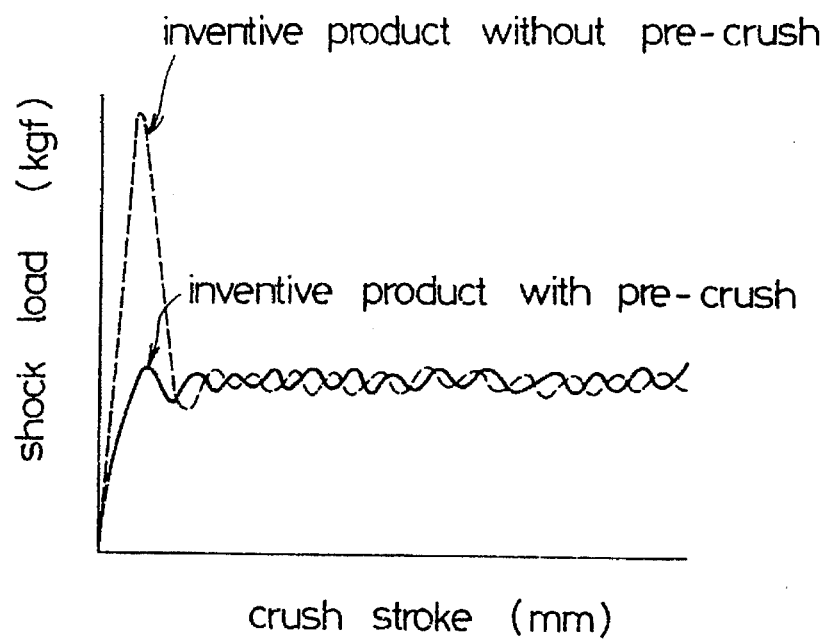
FIG. 7 is a graph display representing a shock-absorbing performance characteristics of the modified shock-absorbing means shown in FIG. 6.
Figure 8:
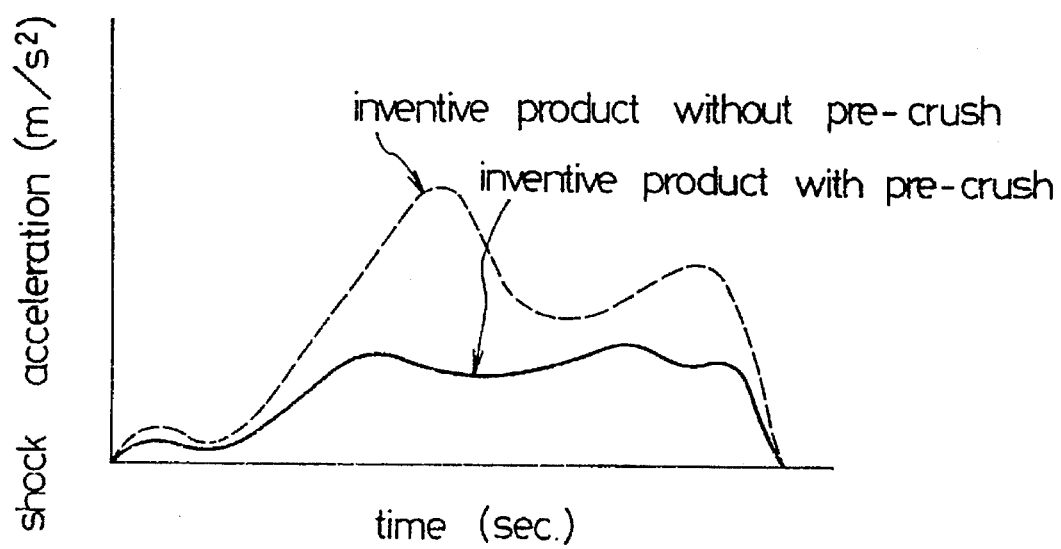
FIG. 8 graphically illustrates the shock acceleration speed of the modified shock-absorbing means in FIG. 6 as plotted against time.

Reference to FIG. 6 shows a modified form of shock-absorbing means S' which is substantially identical in construction with but differs from the shock-absorbing means S shown in FIGS. 3a and 3b in that a modified honeycomb core structure is provided with a pre-crushed or pre-creased portion S5 either at the upper end adjoining the upper surfacing plate S2 as presently shown or at the lower end adjoining the lower surfacing plate S3. The provision of the pre-crushed portion S5 has been found surprisingly effective in reducing the peak of an initial load applied to the shock-absorbing means S' as graphically depicted in FIG. 7. This is due to the tendency that the thus modified honeycomb core structure becomes collapsible progressively from the pre-crushed portion S5 along the core walls S4 in the event of a vehicle collision, resulting in decreased shock acceleration and enhanced shock energy absorption as illustrated in FIG. 8. The honeycomb core structure may be pre-crushed or pre-creased by press, notching or other suitable means for a length sufficient to induce a collapse in and along the core walls S4.

The invention will be further described by way of the following examples which are given only for purposes of illustration but should not be construed in a limiting sense.

EXAMPLE 1

A honeycomb core structure as shock-absorbing means S was produced from a steel foil, having hexagonal cells S1 of 15 mm in size L with a core wall thickness T of 80 μm and a core height H of 50 mm. The structure was adhesively covered at opposite open ends with 0.4 mm thick surfacing plates of steel.

EXAMPLE 2

A honeycomb core structure S' as shock-absorbing means S was produced by provisionally crushing with a press an upper end wall portion of the product obtained in Example 1, the thus crushed portion being 5 mm in length.

EXAMPLE 3

An aluminum foil was formed into a honeycomb core structure for shock-absorbing means S comprising hexagonal cells S1 of 9.5 mm in size L, 25 μm in core wall thickness T and 50 mm in core height H. The structure was adhesively covered at opposite open ends with 0.4 mm thick surfacing plates of steel.

EXAMPLE 4

The product of FIG. 3 was further processed by provisionally crushing with a press an upper end wall portion thereof for a length of 5 mm.

Figure 9:
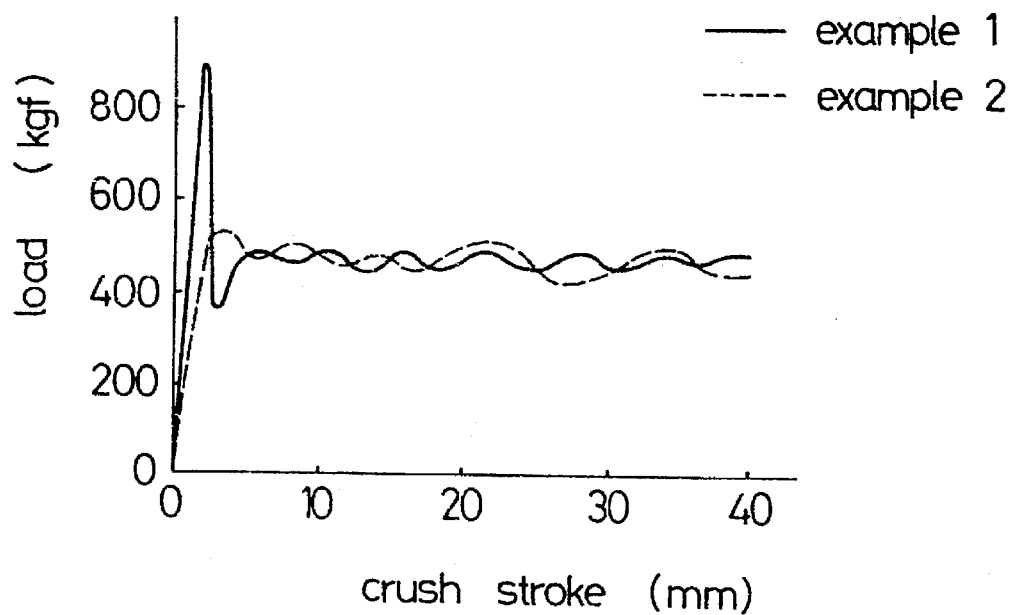
FIG. 9 graphically illustrates the shock-absorbing performance characteristics of a steel-based shock-absorbing means embodying the invention.
Figure 10:
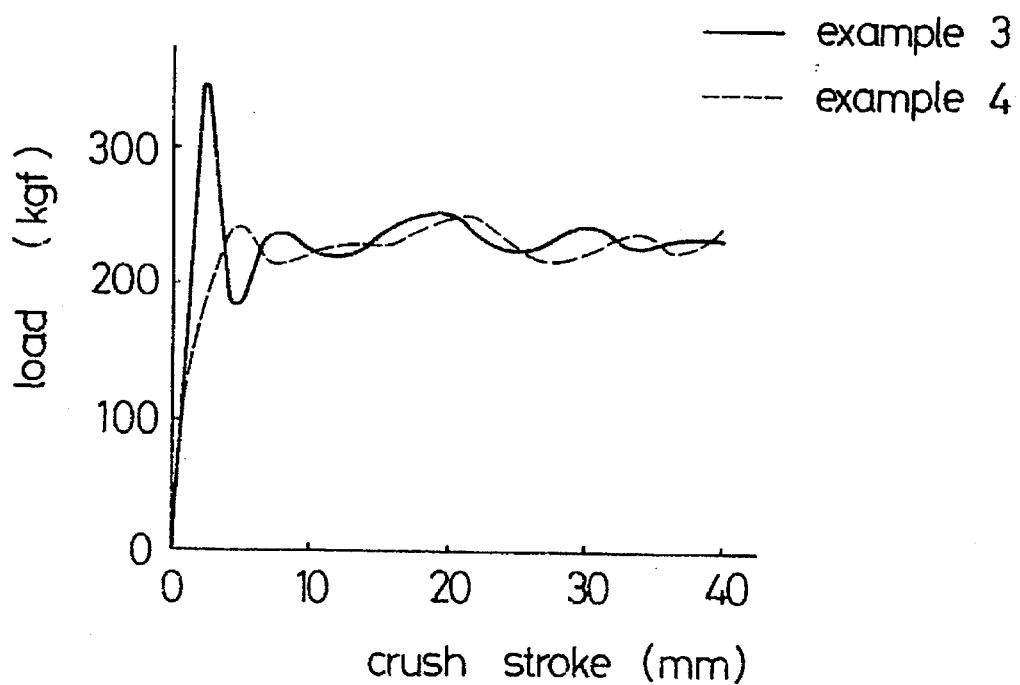
FIG. 10 graphically illustrates the shock-absorbing performance characteristics of an aluminum-based shock-absorbing means embodying the invention.
Figure 11:
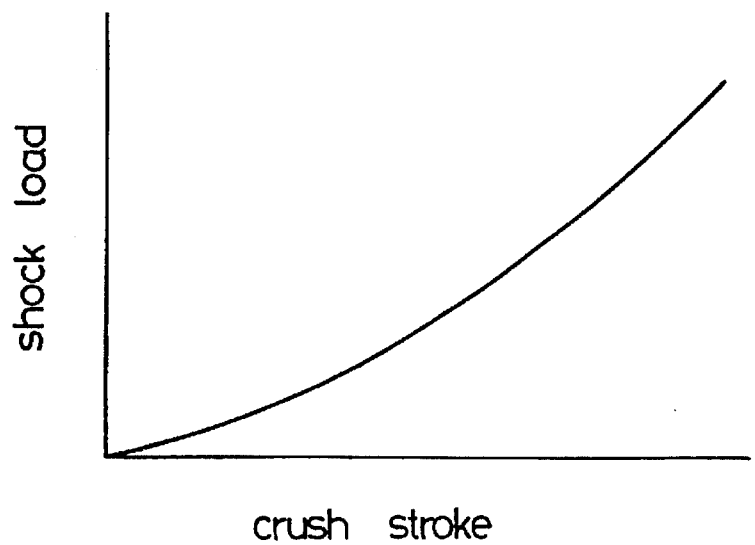
FIG. 11 graphically illustrates the shock-absorbing performance characteristics of a conventional urethane resin-based shock-absorbing element.
Figure 12:
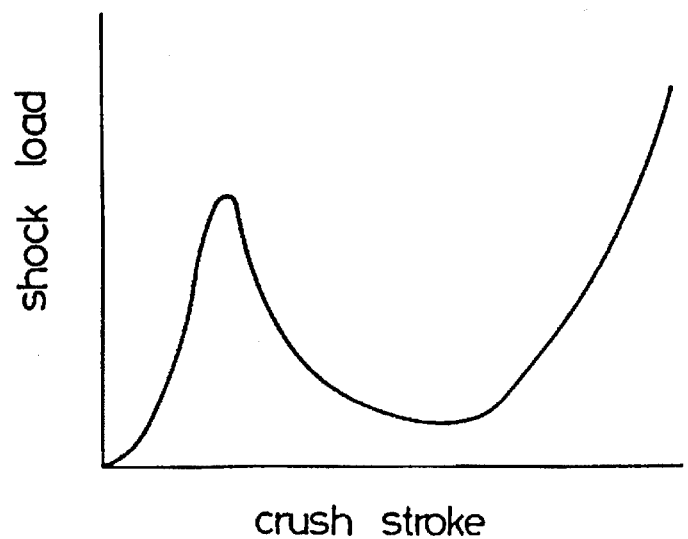
FIG. 12 graphically illustrates the shock-absorbing performance characteristics of a conventional steel skeleton element.

A sample of each of the shock-absorbing means S and S' produced as above and measuring 85 mm in length and 80 mm in width was tested for shock-absorbing performance in accordance with the procedures stipulated in MIL-STD-401B (Crush Stroke vs Load) and FMVSS, page 208 (Shock Acceleration with Time), with the results shown in FIGS. 9 and 10. It is clear from these graphic representations that all of the exemplified inventive shock-absorbing means are capable of high and stable shock energy absorption as evidenced by substantially constant buckling load sustained after a vehicle collision. It is also surprising to note that the modified shock-absorbing means S' incorporating a pre-crushed end portion S5 (FIG. 6) is exposed to very small initial load, leading to reduced shock acceleration and hence so much improved shock energy absorption. The initial and buckling load values may be controlled by proper selection of a honeycomb core material, its cell size and core wall thickness.

Various changes or modifications may be made in the specific construction herein above advanced as appears obvious to those skilled in the art without departing from the scope of the appended claims.

What is claimed is:

1. A vehicle steering wheel comprising an outer, annular steering portion, an inner, hollow cap-shaped center portion having a chamber therein that extends between a relatively thin upper wall member and a relatively rigid lower frame member, spokes extending radially between said cap-shaped center portion and said annular steering portion and shock-absorbing device located in said chamber between said upper wall and lower frame members of said cap-shaped center portion, said shock-absorbing device comprising a honeycomb core structure; having top, bottom, and side portions and formed from a multiplicity of interconnected cells having opposite open ends at the top and bottom portions of the structure, said cells being defined by core walls that extend between said open ends and in and along a direction in which a shock energy would be applied to said upper wall member of the cap-shaped center portion of the steering wheel, said opposite open ends of said cells being covered with upper and lower surfacing plate members, said side portions of said honeycomb core structure being free of any surrounding structure and a portion of the cells of said honeycomb core structure being pre-crushed in the region of said open ends of the cells adjoining the upper surfacing plate member or in the region of said open ends of the cells adjoining the lower surfacing plate member.

2. The vehicle steering wheel of claim 1, wherein said honeycomb core structure is formed from a material selected from the group consisting of metals, papers, and resins.

3. The vehicle steering wheel of claim 2, wherein said honeycomb core structure is formed of a steel foil.

4. The vehicle steering wheel of claim 3, said steel foil honeycomb core structure has a cell size in the range of from 7.0 to 25.0 mm, a core wall thickness in the range of from 70 to 150 μm and a core height in the range of from 15 to 100 mm.

5. The vehicle steering wheel of claim 2, wherein said honeycomb structure is formed of an aluminum foil.

6. The vehicle steering wheel of claim 5, said aluminum foil honeycomb core structure has a cell size in the range of from 6.0 to 25.0 mm, a core wall thickness in the range of from 25 to 75 μm and a core height in the range of from 15 to 100 mm.

* * * * *